United States Patent [19]

Katsoulis et al.

[11] Patent Number: 5,747,608
[45] Date of Patent: May 5, 1998

[54] RUBBER-MODIFIED RIGID SILICONE RESINS AND COMPOSITES PRODUCED THEREFROM

[75] Inventors: Dimitris Elias Katsoulis; John Robert Keryk, both of Midland, Mich.; Frederick Jerome McGarry, Weston, Mass.; Randall Gene Schmidt, Midland, Mich.; Ramnath Subramanian, Wahteton, N. Dak.; Harold Lewis Vincent, Midland, Mich.; Bizhong Zhu, Somerville, N.J.

[73] Assignees: Dow Corning Corporation, Midland, Mich.; Massachusetts Inst. Tech., Cambridge, Mass.

[21] Appl. No.: 775,661

[22] Filed: Dec. 31, 1996

[51] Int. Cl.[6] .................................................. C08F 283/00
[52] U.S. Cl. .............................. 525/477; 528/15; 528/17; 528/18; 528/19; 528/21
[58] Field of Search ............................ 528/15, 17, 18, 528/19, 21; 525/477

[56] References Cited

U.S. PATENT DOCUMENTS

| | | | |
|---|---|---|---|
| 3,328,481 | 6/1967 | Vincent | 260/825 |
| 3,607,972 | 9/1971 | Kiles et al. | 260/825 R |
| 5,034,061 | 7/1991 | Maguire et al. | 106/287.14 |
| 5,470,923 | 11/1995 | Krahnke et al. | 525/477 |

FOREIGN PATENT DOCUMENTS 691206 7/1964 Canada .................................. 400/73

OTHER PUBLICATIONS

"Effects of Rubber Additions on the Fracture Toughness of a Polyester Resin", Mandell and McGarry, Section 23–F p. 1–4.
American Chemical Society: "Cracked Toughened Polyester Resin Formulations" McGarry and Sultan pp. 527–537.
American Chemical Society: Apr. 1968; PMSE; "Molecular Network System:A Toughened Crosslinked System"; McGarry and Subramanian pp. 95–97.

Primary Examiner—Melvyn I. Marquis
Attorney, Agent, or Firm—Arne R. Jarnholm

[57] ABSTRACT

Novel rubber-modified rigid silicone resins are disclosed. The novel resins are the copolymerized reaction product of (A) an organosilicon composition selected from the group consisting (I) an organosilicone resin, (II) hydrolyzable precursors of (I), and an hydrolyzate of (II) and (B) an silicone rubber. The novel rubber-modified rigid silicone resins of the invention show remarkably high fracture toughness, $K_{Ic}$, and critical strain energy release rate $G_{Ic}$.

20 Claims, 8 Drawing Sheets

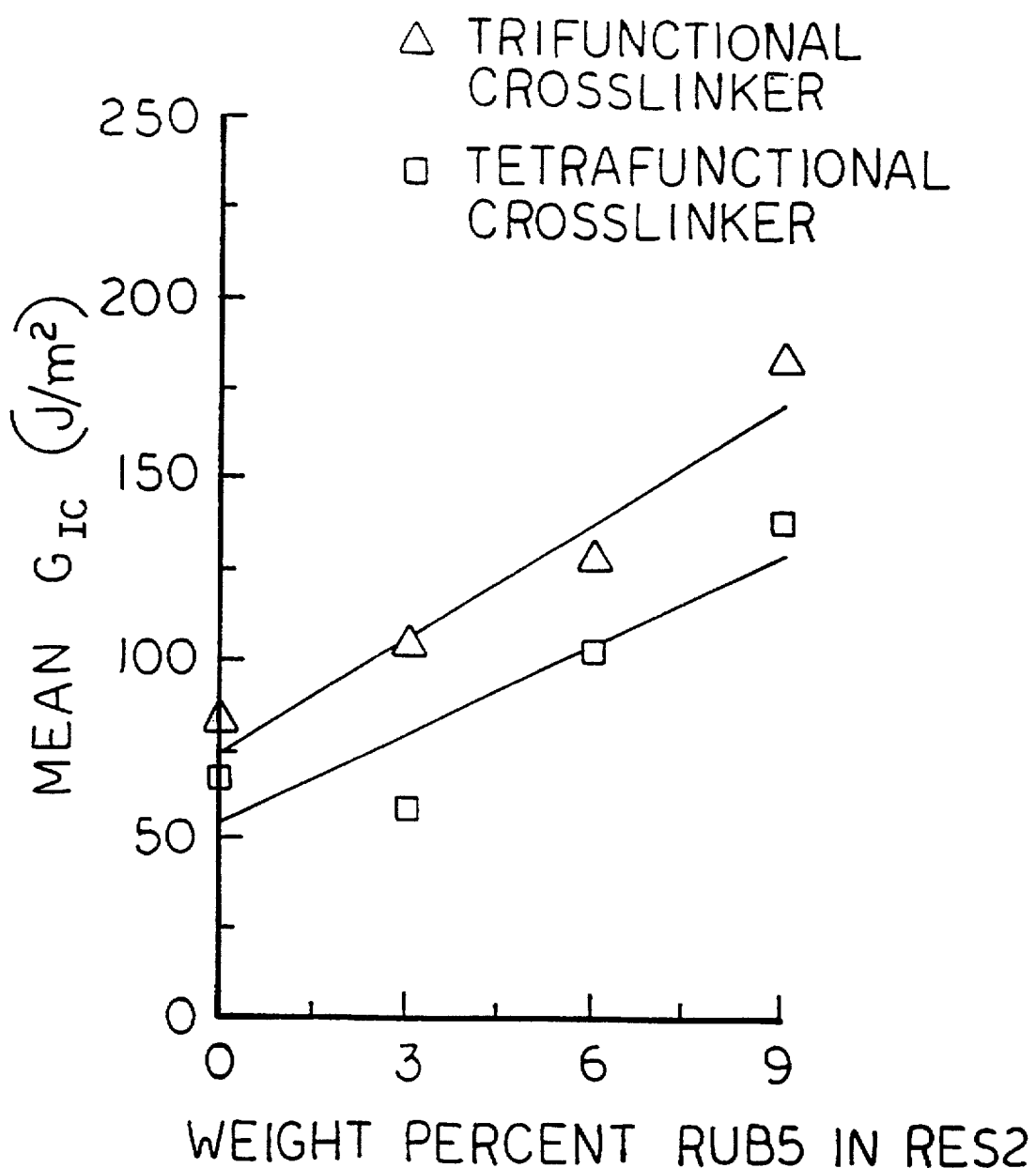

RUBBER-MODIFIED RIGID SILICONE RESINS AND COMPOSITES PRODUCED THEREFROM

BACKGROUND OF THE INVENTION

1. Field of the Invention

The present invention relates generally to the field of silicone resins and more particularly to such resins having silicone rubbers incorporated into their structure. The rubber-modified silicone resins and reinforced composites produced therefrom show a marked improvement in fracture toughness.

2. Description of the Prior Art

For some time, it has been known that making rubber additions to organic polymer resins can increase the toughness thereof. Such systems are disclosed in, for instance, an article entitled *Effects of Rubber Additions On The Fracture Toughness Of A Polyester Resin* (Tetlow, P. D. et al. Proceedings of the Annual Technical Conference, 1979, Reinforced Plastics/Composites Institute The Society of the Plastics Industry, Inc. Vol. 34, 23F) and a paper entitled *Crack Toughened Polyester Resin Formulations* (McGarry, F. J. et al., American Chemical Society Division of Organic Coating and Plastics Chemistry Vol. 28, No. 1, pp 526–36) presented in San Francisco in April, 1968.

Increasing the toughness of various silicone compositions has also been previously carried out. Maguire et al., U.S. Pat. No. 5,034,061 discloses a silicone resin/fluid polymer adapted to form a transparent, shatter-resistant coating. The composition includes a silicone resin copolymer consisting essentially of $R_3SiO_{1/2}$ and $SiO_{4/2}$ units with unsaturated olefinic functional R groups, a polydiorganosiloxane fluid with vinyl functionality, an organopolysiloxane crosslinker having hydrogen functionality and a catalyst. The composition is disclosed as being particularly adapted for use in coating incandescent glass lamps.

Canadian Patent No 691,206 (1964,) Fenner, assigned to Dow Corning Corporation, discloses the use of silica-filled silicone resin/fluid combinations for damping vibrations. The ability of the disclosed silicone resin/fluid compositions to dampen vibrations is illustrated through the measurement of the ratio of G', the elastic shear modulus, to G", the loss shear modulus. The magnitude of this ratio is indicated as being inversely proportional to the ability of the material to absorb vibration. The ratio of G'/G" of the subject materials is compared to that of compositions prepared without a resin constituent.

The above-described toughened silicone compositions are generally of the types having a fairly low modulus of elasticity. Heretofore, successfully increasing the fracture toughness of rigid silicone resins has not been accomplished. As used herein to describe silicone resins, the term "rigid" means that the resin material, in its unfilled condition, exhibits a certain "stiffness" characterized by having a Young's modulus of at least $6.9 \times 10^8$ Pa. As used herein, the term "unfilled" means that no reinforcing fillers, such as carbon or glass fibers or silica powders have been added to the resin.

Rigid silicone resins have long been employed in applications that take advantage of their heat- and fire-resistant properties. These properties make the silicone resins attractive for use in fiber-reinforced composites for electrical laminates, structural use in automotive components, aircraft and naval vessels. The unmodified rigid silicone resins of the prior art are, however, quite brittle which severely limits their use.

Thus, there exists a need for rigid silicone resins having substantial increased fracture toughness which would permit the exploitation of the unique fire-, electrical- and heat-resistant properties in applications where brittle failure must be avoided.

SUMMARY OF THE INVENTION

In accordance with the present invention, there is provided a rubber-modified rigid silicone resin having improved fracture toughness. The rubber-modified rigid silicone resin of the invention comprises a copolymer formed from:

(A) an organosilicon composition selected from the group consisting of:

(I) an organosilicone resin of the empirical formula

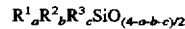

wherein: a is a positive numerical value, b and c are zero or positive numerical values with the proviso that $0.8 \leq (a+b+c) \leq 1.6$, $R^1$, $R^2$ and $R^3$ are monovalent radicals independently selected from the group consisting of hydrogen, hydroxyl, alkyl, alkenyl, alkoxy, oximo, alkyloximo, aryloximo, aryl, alkylepoxide, arylepoxide, alkylcarboxyl, arylcarboxyl, alkylether, arylether, alkylamide, arylamide, alkyl amino and arylamino radicals; and (II) hydrolyzable precursors of (I); and (III) an hydrolyzate formed from (II); and (B) a silicone rubber of the empirical formula:

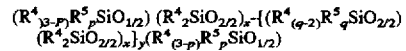

wherein each $R^4$ is a monovalent radical independently selected from the group consisting of alkyl and aryl radicals, each $R^5$ is a monovalent radical independently selected from the group consisting of hydrogen, hydroxyl, alkenyl, alkoxy, oximo, alkyloximo, aryloximo, alkylepoxide, arylepoxide, alkylcarboxyl, arylcarboxyl, alkylamide, arylamide, alkyl amino and arylamino radicals, p is 1, 2 or 3, q is 1 or 2, x is greater than or equal to 6, and y ranges from zero to 10; and said organosilicon composition (A) and said silicone rubber (B) being present in relative quantities such that said rubber-modified silicone resin has a Young's modulus of at least $6.9 \times 10^8$ Pa.

The novel rubber-modified rigid silicone resins of the invention are produced by copolymerization. The copolymerization may be carried out via condensation reaction, addition reaction or free radical polymerization.

In the case where copolymerization is carried out via a condensation reaction, final cure of the resin may be accomplished after such copolymerization, by a heating step. It is believed that this heating step causes further condensation between the copolymerized molecules.

Thus, the invention includes a novel method of producing a rubber-modified rigid silicone resin, comprising the steps of:

(1) dissolving, in an organic solvent, the following components so as to form a solution therefrom, said components comprising:

(A) an organosilicon composition selected from the group consisting of:

(I) an organosilicone resin of the empirical formula

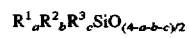

wherein: a is a positive numerical value, b and c are zero or positive numerical values with the proviso that 0.8<(a+b+c)<1.6, $R^1$, $R^2$ and $R^3$ are monovalent radicals independently selected from the group consisting of hydrogen, hydroxyl, alkyl, alkenyl, alkoxy, oximo, alkyloximo, aryloximo, aryl, alkylepoxide, arylepoxide, alkylcarboxyl, arylcarboxyl, alkylether, arylether, alkylamide, arylamide, alkyl amino and arylamino radicals;

said organosilicone resin having been formed by the hydrolysis and condensation of (II) hydrolyzable precursors of (I);

(II) hydrolyzable precursors of (I); and (III) an hydrolyzate formed from (II);

(B) a silicone rubber of the empirical formula:

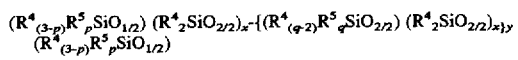

wherein each $R^4$ is a monovalent radical independently selected from the group consisting of alkyl and aryl radicals, each $R^5$ is a monovalent radical independently selected from the group consisting of hydroxyl, alkoxy, oximo, alkyloximo, aryloximo, alkylcarboxyl, arylcarboxyl, and p is 1, 2 or 3, q is 1 or 2, x is greater than or equal to 6, and y ranges from zero to 10; and (C) a condensation catalyst;

(2) copolymerizing substantially all of component (B) with component (A), without causing precipitation of the copolymerized product from solution or the gelation thereof;

(3) devolatilizing the copolymerized solution; and (4) heating said devolatilized, copolymerized solution to a temperature sufficient to cause the same to cure.

It is therefore an object of the present invention to provide a rubber-modified silicone resin having a Young's modulus of at least $6.9 \times 10^8$ Pa in the unfilled condition.

It is another object of the present invention to provide a rubber-modified rigid silicone resin that, in the unfilled condition, has increased fracture toughness, as measured by $K_{Ic}$, increased critical strain energy release rate, as measured by $G_{Ic}$, and integrated stress-strain toughness, compared to the silicone resin in its unmodified and unfilled condition.

Still another object of the present invention is to provide a novel method of producing a rubber-modified rigid silicone resin.

It is a feature of the present invention that the values of $K_{Ic}$ and $G_{Ic}$ of the rubber-modified silicone resin of the present invention may be increased over 25%, as compared to the silicone resin in its unmodified and unfilled condition.

It is another feature of the present invention that the values of $K_{Ic}$ and $G_{Ic}$ of the rubber-modified silicone resin of the present invention may be increased over 50%, as compared to the silicone resin in its unmodified and unfilled condition.

It is yet another feature of the present invention that the values of and $K_{Ic}$ and $G_{Ic}$ of the rubber-modified silicone resin of the present invention may be increased over 100%, as compared to the silicone resin in its unmodified and unfilled condition.

It is yet another feature of the present invention that the value of $G_{Ic}$ of the rubber-modified silicone resin of the present invention may be increased over 200%, as compared to the silicone resin in its unmodified and unfilled condition.

BRIEF DESCRIPTION OF THE DRAWINGS

FIG. 8 is a graph of the critical strain energy release rate, $G_{Ic}$, of the silicone rubber-modified resin of FIG. 7, as determined in accordance with ASTM D 5045 and shown as a function of weight percent silicone rubber.

DETAILED DESCRIPTION OF THE INVENTION

Figure 1:
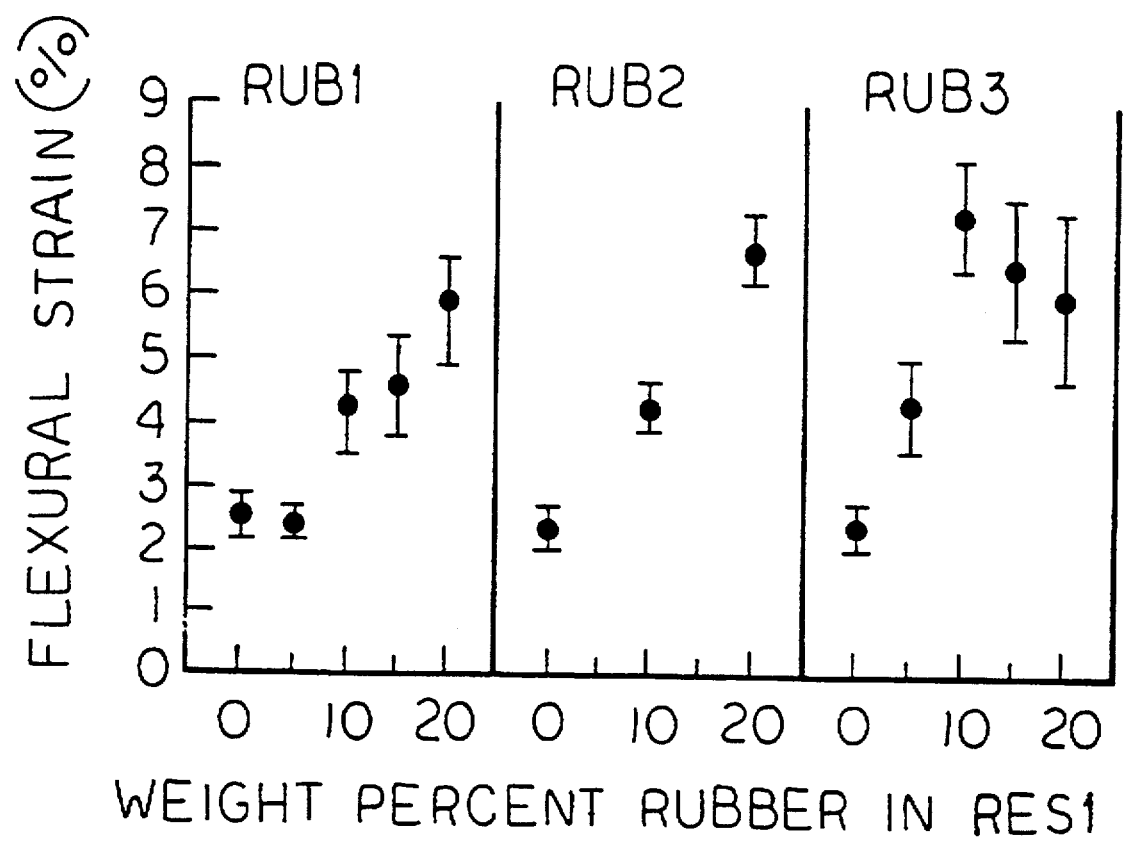
FIG. 1 is a graph of the Flexural Strain (%) at fracture (derived from three point bending in accordance with ASTM D 790) as a function of weight percent silicone rubber for RES1, a methylphenylsilsesquioxane resin modified with three different silicone rubbers (RUB1, RUB2 and RUB3) having three different degrees of polymerization, which modifications were carried out using a condensation reaction.

The rubber-modified rigid silicone resin of the present invention comprises a copolymer formed from: (A) an organosilicon composition selected from the group consisting of (I) an organosilicone resin, (II) hydrolyzable precursors of (I); and (III) an hydrolyzate formed from (II); and (B) a silicone rubber.

The organosilicone resin (I) has the empirical formula

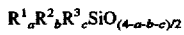

wherein: a is a positive numerical value, b and c are zero or positive numerical values with the proviso that $0.8 \leq (a+b+c) \leq 1.6$, and each $R^1$, $R^2$ and $R^3$ are monovalent radicals independently selected from the group consisting of hydrogen, hydroxyl, alkyl, alkenyl, alkoxy, oximo, aryl, alkylepoxide, arylepoxide, alkylcarboxyl, arylcarboxyl, alkylether, arylether, alkylamide, arylamide, alkyl amino and arylamino radicals.

The organosilicone resin (I) of the organosilicon composition (A) is of the silsesquioxane-type and is made in a known manner by the hydrolysis and condensation of hydrolyzable precursors (II) of (I), which include the aforementioned $R^1$, $R^2$ and $R^3$ groups as a part of their structure. Such hydrolyzable precursors include trifunctional silanes, such as organotrialkoxysilanes and organotrihalosilanes, which produce the desired three dimensional resin structure, and monofunctional silanes, such as triorganomonoalkoxysilanes, triorganomonohalosilanes, disiloxanes and disilazanes, which act as endcappers. Those skilled in the art will also appreciate that difunctional silanes, such as diorganodihalosilanes and diorganodialkoxysilanes, and small amounts tetrafunctional silanes, such as tetrahalosilanes and tetraalkoxysilanes, may be included in the resin precursors.

In the preferred embodiment of the invention, the vast majority of the $R^1$, $R^2$ and $R^3$ groups are nonfunctional. That is to say, those groups do not participate in the copolymerization reaction to produce the rubber-modified rigid silicone resin of the invention and are preferably alkyl groups, aryl groups or a combination thereof and most preferably methyl groups, phenyl groups or a combination thereof.

The second component of the present invention is (B) a silicone rubber of the empirical formula:

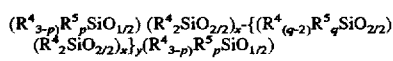
$$(R^4{}_{3-p}R^5{}_p SiO_{1/2})(R^4{}_2 SiO_{2/2})_x\text{-}\{(R^4{}_{(q-2)}R^5{}_q SiO_{2/2})(R^4{}_2 SiO_{2/2})_x\}_y(R^4{}_{3-p}R^5{}_p SiO_{1/2})$$

wherein each $R^4$ is a monovalent radical independently selected from the group consisting of alkyl and aryl radicals, each $R^5$ is a monovalent radical independently selected from the group consisting of hydrogen, hydroxyl, alkenyl, alkoxy, oximo, alkyl oximo, aryloximo, alkylepoxide, arylepoxide, alkylcarboxyl, arylcarboxyl, alkylamide, arylamide, alkyl amino and arylamino radicals, p is 1, 2 or 3, q is 1 or 2, x is an integer greater than or equal to 6, and y is zero or an integer up to 10.

It is important to note that the $R^4$ groups denote only alkyl and aryl groups. Hence, the $R^4$ groups do not participate in the copolymerization reaction. Each $R^5$, however, is a functional group which does participate in the copolymerization reaction to form the copolymer of the present invention.

In the above formula, x represents the average nonfunctional linear chain length of the silicone rubber, i.e. the average chain length between $R^5$ groups. Hence, a mixture of silicone rubbers (B) of various degrees of polymerization can still be represented by above empirical formula. Most silicone rubbers used in connection with the present invention have $R^5$ groups only at the terminal groups of the chain. In such instances, the term "degree of polymerization" ("DP") as used herein is the same as the value of x. That is to say, the term DP does not include the terminal functional siloxy groups.

In the preferred embodiment of the invention, the $R^4$ groups are methyl groups, phenyl groups or a combination thereof.

The present inventors have found that, when a high percentage of the $R^1$, $R^2$, $R^3$ of the organosilicon composition (A) and $R^4$ groups of the silicone rubber (B) are either predominantly methyl or predominantly phenyl, the organosilicon composition (A) and the silicone rubber (B) are generally compatible, permitting the rubber to be dispersed throughout the resin structure in a relatively homogeneous manner.

It has also been found that when the DP of the silicone rubber (B) becomes relatively large, e.g. between about 55 and 200, the rubber (B) tends to segregate from the resin, resulting in the formation of a distinct two phase system. In formulating such compositions of the invention, the organosilicon composition (A) and rubber (B) are dissolved in an organic solvent at relatively low solids concentration (i.e. from extremely dilute to about 30%, by weight.) At higher concentrations, it becomes very difficult to form a homogeneous solution of an organosilicon composition (A) in the form of a resin (I) and rubber (B).

Segregation into a two phase system has also been noted in the cured, rubber-modified resin matrix, even though such segregation was not noted in the organic solution from which it was formed. It is believed that in certain instances such post-curing segregation may enhance the mechanical properties of the rubber-modified resin of the invention. Indeed, it is possible to utilize silicone rubber (B) having a DP as high as 1,000.

In accordance with the present invention, the organosilicon composition (A) and the silicone rubber (B) are present in relative quantities such that the cured rubber-modified rigid silicone resin has a Young's modulus of at least $6.9 \times 10^8$ Pa. The present inventors have discovered that the Young's modulus of the rubber-modified silicone resins of the invention decreases with increasing rubber content. Thus, the relative quantities of the organosilicon composition (A) and rubber (B) are selected such that the rigidity of the cured resin is not compromised to the extent that it cannot be satisfactorily used for structural applications. It will also be appreciated that the type of silicone rubber and the use of cross-linkers can also affect the Young's modulus of the modified resins of the invention. In most instances, however, silicone rubber additions in excess of about 30 weight percent of the modified resin generally result in a composition having a Young's modulus less than that stipulated above. Likewise, the beneficial effects of increased toughening are generally not realized unless at least about 2 weight percent of (B) silicone rubber is used.

In one embodiment of the invention, the organosilicon composition (A) is an organosilicone resin (I) which is first formed to the desired molecular weight before copolymerization with silicone rubber (B). It is preferable to first blend the resin (I) with the silicone rubber (B) in an organic solvent, such as toluene, along with the desired amount of crosslinker and a catalytic amount of an appropriate catalyst. The composition is devolatilized, cast into a mold and thereafter thermally cured. In some instances, devolatilization can take place in the mold. If devolatilization is carried out at an elevated temperature, the addition of the curing catalyst is made after cooling.

In another embodiment of the invention, the composition may be injection molded after the devolatilization step.

In compositions of the invention which utilize condensation reactions between the organosilicon composition (A) and rubber (B), it is possible to first selectively copolymerize the organosilicon composition (A) molecules and the rubber (B) molecules, with one another, before carrying out final cure.

For example, an organosilicon composition (A) in the form of a resin (I) and the silicone rubber (B) are dissolved in an organic solvent, such as toluene, along with the desired amount of a crosslinker, if any, and a condensation catalyst. It is preferred to use a relatively weak condensation catalyst such as titaniumtetrabutoxide. At a temperature of about 90° C., this first, relatively weak catalyst triggers the copolymerization step between the organosilicon composition (A) molecules, the rubber (B) molecules and the cross-linker molecules, if any, without causing substantial homopolymerization between organosilicon composition (A) molecules or rubber (B) molecules. The reaction is preferably carried out to the extent that substantially all of the rubber (B) molecules have been copolymerized with the organosilicon compound (A). This result has been confirmed utilizing $^{29}Si$ nuclear magnetic resonance spectroscopy.

It is anticipated that the alkoxides of the other Group IVA metals, zirconium and hafnium, would likewise function as relatively weak condensation catalysts.

Those skilled in the art will recognize that under the above conditions, some homopolymerization takes place. The lack of substantial homopolymerization means, however, that the system does not gel and the copolymer so-formed remains soluble and stable in the organic solvent. The skilled artisan will also recognize that this "light" copolymerization is akin to light bodying. Light copolymerization can be controlled by the concentration of the catalyst used, relative to its catalytic strength, and the temperature at which the light copolymerization is carried out.

The copolymer in the "lightly" copolymerized state described above remains in solution. Thereafter, a relatively strong condensation catalyst, such as Dow Corning® catalyst 15, or Y-177, choline octoate and zinc octoate catalysts, respectively, (both of which are commercially available from the Dow Corning Corporation, Midland Mich.,) can be added to the "lightly copolymerized" solution. The solution may then be cast, devolatilized and finally cured to a rigid state by the application of heat. Often, final curing can be augmented by the application of pressure. In the condensation cure system, it is believed that final cure is accomplished through the condensation of residual silanol groups associated with the resin (I).

When the silicone rubber (B) contains hydrolyzable or condensable $R^5$ groups, the rubber (B) may be blended with the hydrolyzable precursors (II) of the organosilicone resin (I), or (III) a partial hydrolyzate of (II), which is then followed by a hydrolysis/condensation reaction to complete the light copolymerization step and to cause growth of the resin network molecules. The light copolymerization step may be catalyzed with a relatively weak catalyst, as above, until the composition reaches a desired viscosity for casting. Thereafter, the composition is devolatilized and an appropriate relatively strong condensation catalyst may be added. The material is then cast and finally thermally cured.

Regardless of the route used to obtain the rubber-modified silicone resin of the invention, the cured composition exhibits the desired rigidity and increased fracture toughness.

The copolymer of the present invention may be formed with or without the aid of a crosslinker and, in the case of condensation cured compositions, with or without the aid of a catalyst. Those skilled in the art will appreciate that the use of a crosslinker that includes three or more functional groups that are capable of reaction with the $R^5$ groups of the rubber, yields a branched silicone rubber.

Furthermore, the type of cure mechanism used to obtain the copolymer of the invention, is not particularly limited and may include those generally referred to as a condensation-cure systems, addition-cure systems and free radical polymerization.

Those skilled in the art will appreciate that in systems that incorporate alkenyl groups, such as vinyl groups, to impart reactive functionality to the silicone resin and silicone rubber, free radical polymerization may be used as viable cure system. A free radical initiator, such as a peroxide, is employed. Commonly used initiators include aryl peroxides. A well-known vinyl-specific peroxide initiator is $(CH_3)_3COOC(CH_3)_3$.

For condensation-cure systems, metal esters or alkoxides of tin, titanium and zinc are all preferred catalysts. Titanium tetrabutoxide, dibutyl tin dilaurate and zinc octoate are well-known examples. Tin catalysts, however, tend to decrease the thermal stability of the cured rubber-modified rigid resins of the invention and should be avoided for high temperature applications. Even less preferred but still usable are strong acids and bases, such as sulfuric acid, phosphoric acid, potassium hydroxide, cesium hydroxide, metal silanolates and calcined lime. These latter catalysts likewise compromise the thermal stability of cured rigid silicone castings. Also useful are amine and metal carboxylates and quaternary bases. Those skilled in the art will recognize that certain quaternary bases, such as tetramethyl ammonium hydroxide, have the advantage that they decompose to volatile by-products when heated to curing temperatures, and are thus readily removed from the silicone resin/rubber copolymer matrix of the invention.

Care must be taken when volatile by-products are formed by the cure mechanism. Such volatile by-products can cause a considerable reduction in toughness by the formation of bubbles, which act as casting defects.

For addition-cure systems, platinum-based catalysts, such as chloroplatinic acid, are frequently used. In fact, suitable platinum-based catalysts include platinum compounds and platinum complexes. In addition to chloroplatinic acid, chloroplatinic acid hexhydrate, Karstedt's catalyst (i.e. a complex of chloroplatinic acid with symdivinyltetramethyldisiloxane), dichlorobis (triphenylphosphine)platinum(II), platinum chloride and platinum oxide may all be used.

Those skilled in the art will appreciate that in condensation curing systems, copolymerization between a silicone resin and silicone rubber and final cure of the copolymerized system can be induced in the absence of a catalyst. However, such reactions require the application of high temperatures and for this reason are not preferred. Also, the light, preferential copolymerization described above cannot be accomplished without the aid of a catalyst.

Suitable crosslinkers for practicing the present invention include such crosslinkers that are well known in the production and curing of silicone rubbers. Indeed, all such crosslinkers are silicon-based, meaning that their chemical formulae include at least one silicon atom. Tetraethoxysilane, methyltrimethoxysilane and methyltriacetoxy-, methyltrioximo- and tetraoximosilane are well-known examples. Those skilled in the art will appreciate that crosslinker may include relatively short siloxy chains between reactive functional groups. As used herein, then, the term "crosslinker" is limited to silanes and to such siloxanes wherein the DP of the siloxy chain is less than six.

Those skilled in the art will appreciate that the use of acid hydrolysis and condensation to form organosilicone resins generally results in a composition that includes a considerable concentration of nonsterically-hindered residual hydroxyl groups. Thus, condensation reactions using the residual hydroxy functionality of the resin is a convenient way to form the copolymer of the invention through a condensation cure system.

It is contemplated that the fracture-resistant silicone resin compositions of the invention will have great utility in the manufacture of structural or load-bearing components. Furthermore, the compositions of the invention are very advantageously used as the continuous phase in composite materials, such as fiber-reinforced rubber-modified rigid resins.

Those skilled in the art will appreciate, however, that the compositions of the invention may be put to many other uses. For instance, solutions comprising the lightly copolymerized organosilicon composition (A) and rubber (B) in an organic solvent may be used to form a curable coating over a substrate, which may functional as an adhesive. Likewise, the compositions of the invention may be cured into the form of films or sheet products.

EXAMPLES

RESINS WITHOUT REINFORCING SECOND PHASE

Condensation Cure System

A first resin (designated herein as RES1) was modified with four different types of silicone rubber (designated herein as RUB1, RUB2, RUB3 and RUB4) at various weight percents up to a maximum of about 20 weight percent. The various compositions were prepared in toluene, as described below, cast into square, teflon-lined aluminum molds, devolatilized under vacuum at 110° C. and cured in accordance with the following schedule: 95° C. for 48 hours; 110° C. for 24 hours; 120° C. for 24 hours; 130° C. for 24 hours; 140° C. for 24 hours; 150° C. for 12 hours; 175° C. for 6 hours; 200° C. for 12 hours; 230° C. for 3 hours; and 260° C. for 5 hours. This curing schedule insured that the cured slabs were free of defects such as cracks and bubbles.

Specimens taken from the cured slabs were then subjected to three point bending until fracture in accordance with ASTM D 790 and the flexural strength, strain, Young's modulus and the integrated stress-strain toughness were plotted as a function of weight percent silicone rubber. (See FIGS. 1–4.)

Specimens taken from the cured slabs were likewise prepared and tested in accordance with ASTM D 5045, in the single edge notch three point bending mode and the fracture toughness, $K_{Ic}$, and critical strain energy release rate, $G_{Ic}$, were determined as a function of weight percent silicone rubber. (See FIGS. 5 and 6.)

RES1 was a silsesquioxane resin (commercially from Dow Corning® 4-3136, Dow Corning Corporation, Midland Mich.) having the following empirical formula:

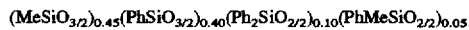
$(MeSiO_{3/2})_{0.45}(PhSiO_{3/2})_{0.40}(Ph_2SiO_{2/2})_{0.10}(PhMeSiO_{2/2})_{0.05}$ and an Mn, number average molecular weight, of about 1,300 or less, where Me and Ph represent methyl and phenyl groups, respectively. The resin is made available in the form of a solid flake.

As previously mentioned, silsesquioxane resins formed by acid hydrolysis/condensation generally include a substantial quantity of nonsterically-hindered hydroxyl groups. The above empirical formula ignores such residual hydroxyl groups (sometimes referred to as residual silanol groups.) Because these groups are the reactive groups responsible for copolymerization in accordance with the invention, the above formula may be rewritten in the approximate empirical form, accounting for the residual hydroxyl groups, as follows:

$Me_{0.69}Ph_{0.43}(OH)_{0.025}SiO_{1.43}$ where Me and Ph are as above.

Each of the various rubbers, RUB1, RUB2, RUB3 and RUB4 were prepared in an identical manner. A dimethylsilanol-terminated polydiorganosiloxane, having a predetermined desired average degree of polymerization (DP), was reacted with a stoichiometric excess of tetraethylorthosilicate in the presence of a potassium acetate catalyst at a temperature between about 130° C. and 150° C., with constant removal of volatiles. Heating was continued until $^{29}Si$ nuclear magnetic resonance spectroscopy (NMR) showed complete triethoxy conversion of the terminal hydroxyl groups was achieved. Unreacted tetraethylorthosilicate was then removed by vacuum stripping and heating.

RUB1, RUB2, RUB3 and RUB4 had, respectively, a DP of 6, 14, 55 and 376.

The modification of RES1 was carried out by dissolving sufficient quantities of RES1 and a given silicone rubber (B) at the desired ratios in toluene. In the case of RUB1 and RUB2, a solution of 50 weight percent solids was used. In the case of RES1 and RUB3, a maximum solids content of about 38 weight percent was used, due to limited compatibility between the higher DP rubber and resin. Likewise, in the case of RES1 and RUB4, a maximum solids content of about 20 weight percent was used, for the same reason. A relatively weak condensation catalyst, in the form of titanium tetrabutoxide catalyst, at a concentration between about 0.1 and 1.0 weight percent was thereafter added. The temperature of the reaction mixture was thereafter raised to 90° C. for three hours, followed by heating to reflux for 25 hours to lightly copolymerize the RES1 and various rubbers (B). The solution was then stripped to about 50–65 weight percent solids, cooled to room temperature, and approximately 0.20 weight percent of a relatively strong condensation catalyst (either Dow Corning® catalyst 15 or Y-177) was added. This solution was then devolatilized and cast into slabs and cured as described above.

Finally, RES1 was copolymerized with a combination of RUB3 and RUB4. Both RUB3 and RUB4 were used at a concentration of five weight percent each, the balance being RES1. This composition was prepared by blending equal parts (solids) of independently prepared lightly copolymerized combinations of RES1 with 10 weight percent RUB3 and RES1 with 10 weight percent RUB4, in toluene. Thereafter, this solution was then devolatilized and cast into slabs and cured as described above.

Addition Cure System

A second resin, RES2, a vinyl-functional silsesquioxane resin, was modified with a dimethylvinylsiloxy-terminated polydimethylsiloxane having an average DP of 9, RUB5, at various weight percents up to a maximum of about 15 weight percent.

RUB5 is a commercially available product from Gelest, Inc. of Tulleytown, Pa., and sold under the designation DMS-VO5.

RES2 was prepared in a known manner from the acid-catalyzed (HCl) hydrolysis/condensation of phenyltrichlorsilane. The reaction product was then washed of acid and further bodied in the presence of potassium hydroxide. The polymerization was terminated by end-capping through the addition of a toluene solution of dimethylvinylchlorosilane. The potassium hydroxide was neutralized and filtered from solution and the resin concentrated to 75 weight percent solids, by weight. The RES2 molecules had an Mn from about 1350 to 1415.

The empirical formula of RES2 can be described as follows:

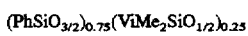
$(PhSiO_{3/2})_{0.75}(ViMe_2SiO_{1/2})_{0.25}$ or, in accordance with the approximate empirical formula:

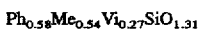
$Ph_{0.58}Me_{0.54}Vi_{0.27}SiO_{1.31}$ wherein Ph and Me are as defined above and Vi represents vinyl groups.

Two different methods were employed to carry out the rubber modifications of RES2. In both methods a stoichiometric excess of SiH-functional crosslinker was employed. In the first method, the crosslinker was trifunctional, being phenyltris(dimethylhydrogensiloxy)silane (commercially available from United Chemical Technologies, Inc.) In the second method, the crosslinker was tetrafunctional, being tetrakis(hydrogendimethylsiloxy)silane.

The various compositions were prepared in the toluene solution of RES2 by dissolving RUB4 at the desired ratios therein. Thereafter, the stoichiometric excess of the crosslinkers were respectively added. The solution was then vacuum degassed for about 1½ hours at 50° C. The solution was then cooled to room temperature and a catalytic amount (about 1 to 100 ppm, by weight) of hexachloroplatinic acid was added thereto. The resulting composition was then cast into teflon-edged, square aluminum molds and cured at 140° C. to 160° C. for 16 hours, removed from the mold and post-cured between about 200° C.–260° C. for 4 to 8 hours. No cracking was observed during curing of the compositions employing the trifunctional crosslinker. Some cracking was observed during curing of the compositions employing the tetrafunctional crosslinker. It was found, however, that the use of lower curing temperatures helped to reduce such cracking.

Specimens taken from cured slabs were likewise prepared and tested in accordance with ASTM D 5045 in the single edge notch bending mode and the fracture toughness, $K_{Ic}$, and critical strain energy release rate, $G_{Ic}$, were determined. (See FIGS. 7 and 8)

RESULTS AND DISCUSSION

Condensation Cure System

The bulk of the results obtained from the above testing is illustrated in the FIGS. 1 through 8. The modification of RES1 with RUB5 is the only example wherein the results are not graphically illustrated. In each of FIGS. 1 through 6, the center point represents the arithmetic mean value of the tested parameter and the vertical bar shows the spread of data. Approximately five to six test specimens were used at each level of rubber loading.

Referring now in particular to FIG. 1, it can be seen that when the silicone rubber has a relatively low DP, as in RUB1 and RUB2 (6 and 14, respectively) greater additions of silicone rubber results in greater strains at fracture. However, when the DP of the silicone rubber is somewhat higher, as in RUB3 (DP=55) the flexural strain at fracture reaches a peak at about 10 weight percent silicone rubber.

Figure 2:
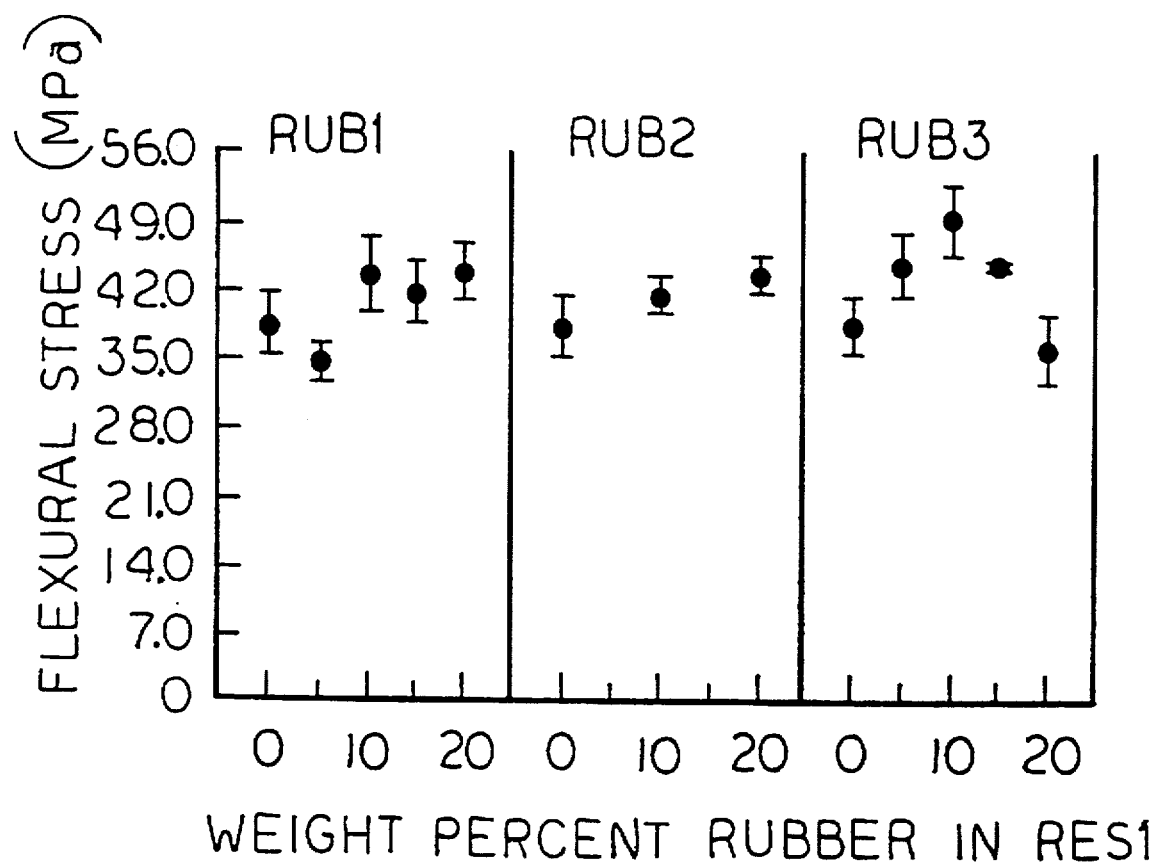
FIG. 2 is a graph of the Flexural Stress, at fracture, of the silicone rubber-modified resins of FIG. 1, as a function of weight percent silicone rubber.
Figure 3:
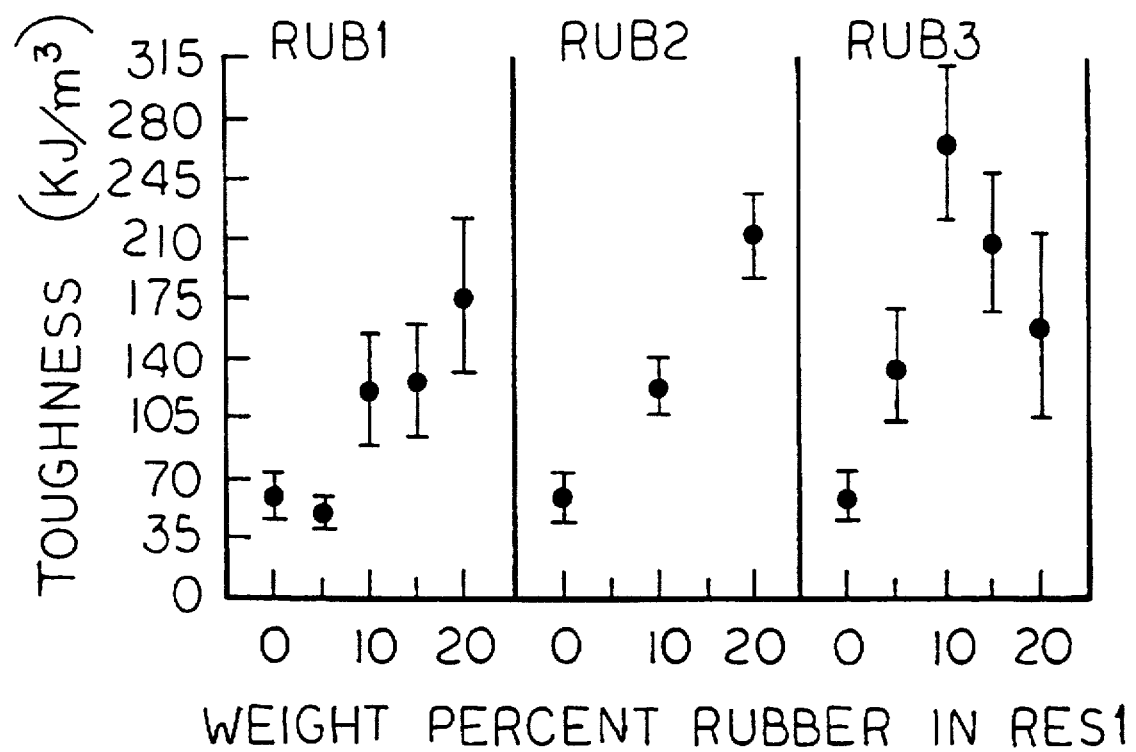
FIG. 3 is a graph of the Toughness of the silicone rubber-modified resins of FIG. 1, as a function of weight percent silicone rubber and as measured by the area under the stress-strain curve.

Referring now to FIG. 2 it can be seen that the flexural stress at fracture, as a function of silicone rubber content, behaves in a manner analogous to that of the strain. FIG. 3 shows that the toughness, as measured by the integrated stress-strain as a function of rubber content also follows the same trends.

Figure 4:
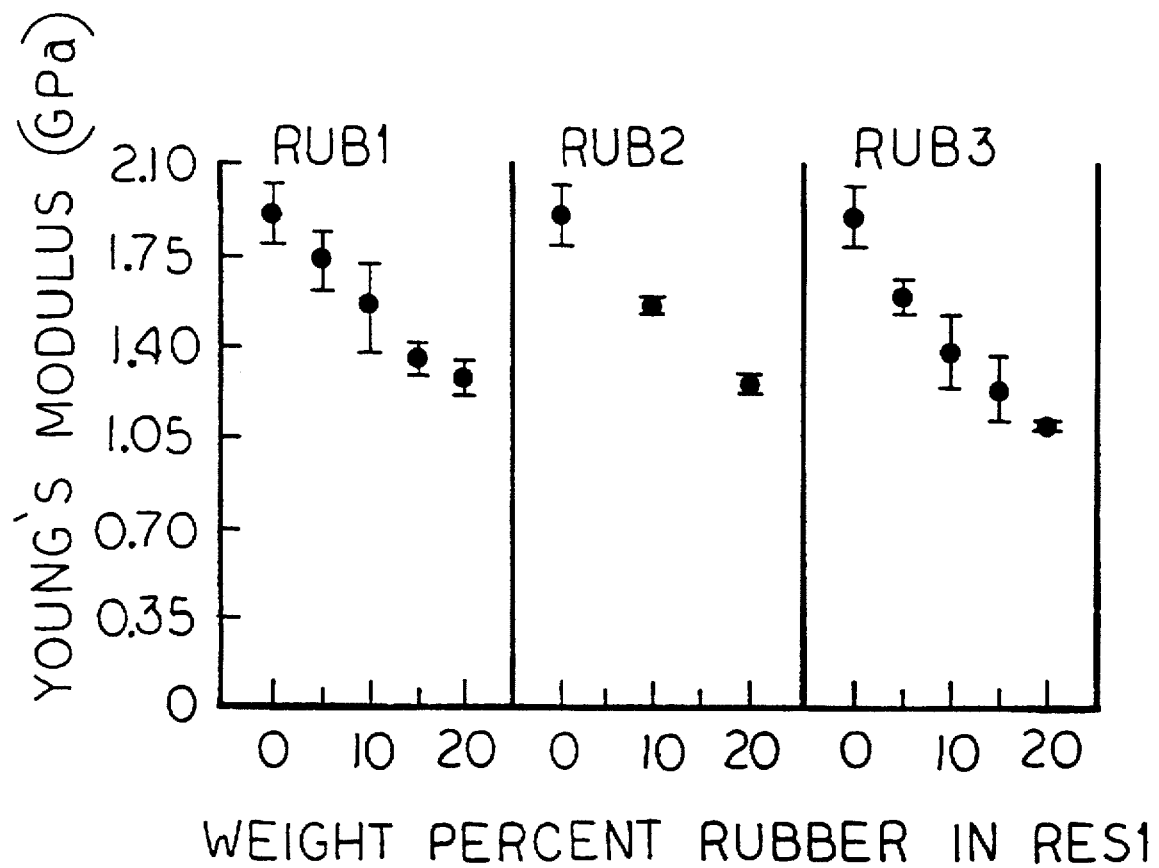
FIG. 4 is a graph of the Young's Modulus of the silicone rubber-modified resins of FIG. 1, as a function of weight percent silicone rubber.

FIG. 4 illustrates that in all instances, regardless of the DP of the rubber used in the copolymer of the invention, increasing the rubber content of the copolymer results in a decrease in Young's modulus, or the "stiffness" of the composition. The present invention is, however directed at improving the fracture toughness of rigid silicones that can be used for making structural components. Hence, only rubber-modified silicone resins having a Young's modulus of at least $6.9 \times 10^8$ Pa are considered to posses the requisite rigidity for such applications.

Figure 5:
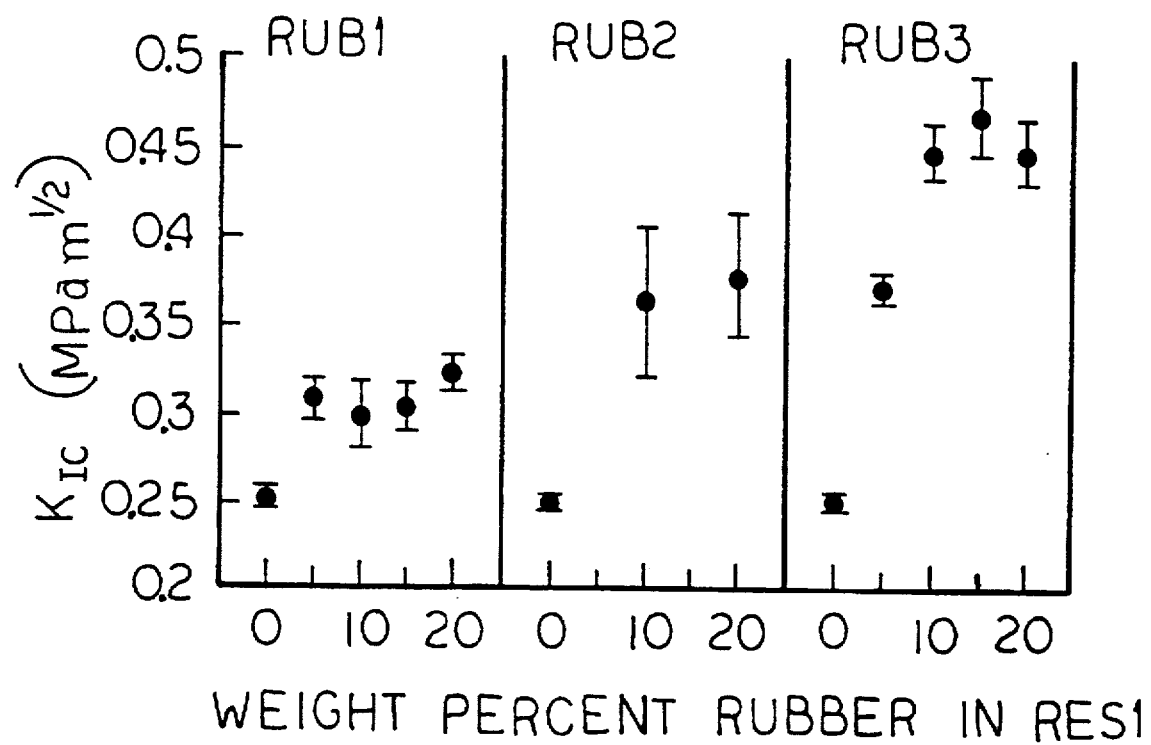
FIG. 5 is a graph of the fracture toughness, $K_{Ic}$, of the silicone rubber-modified resins of FIG. 1, as determined in accordance with ASTM D 5045 and shown as a function of weight percent silicone rubber.

FIG. 5 shows that the fracture toughness, $K_{Ic}$, of RES1 was modestly increased by copolymerization with silicone rubbers having a relatively low DP, such as RUB 1 wherein the DP was 6. Copolymerization with silicone rubbers having a greater DP, such as RUB2, wherein the DP was 14, had a considerably greater effect on the fracture toughness of RES1. Finally, when copolymerization is carried out with a silicone rubber having an even higher DP, such as RUB3 wherein the DP was 55, the value of $K_{Ic}$, as a function of weight percent silicone rubber, behaves in a manner similar to the properties of fracture strain, stress and toughness. A peak value for $K_{Ic}$ results between about 10 and 20 weight percent RUB3.

Figure 6:
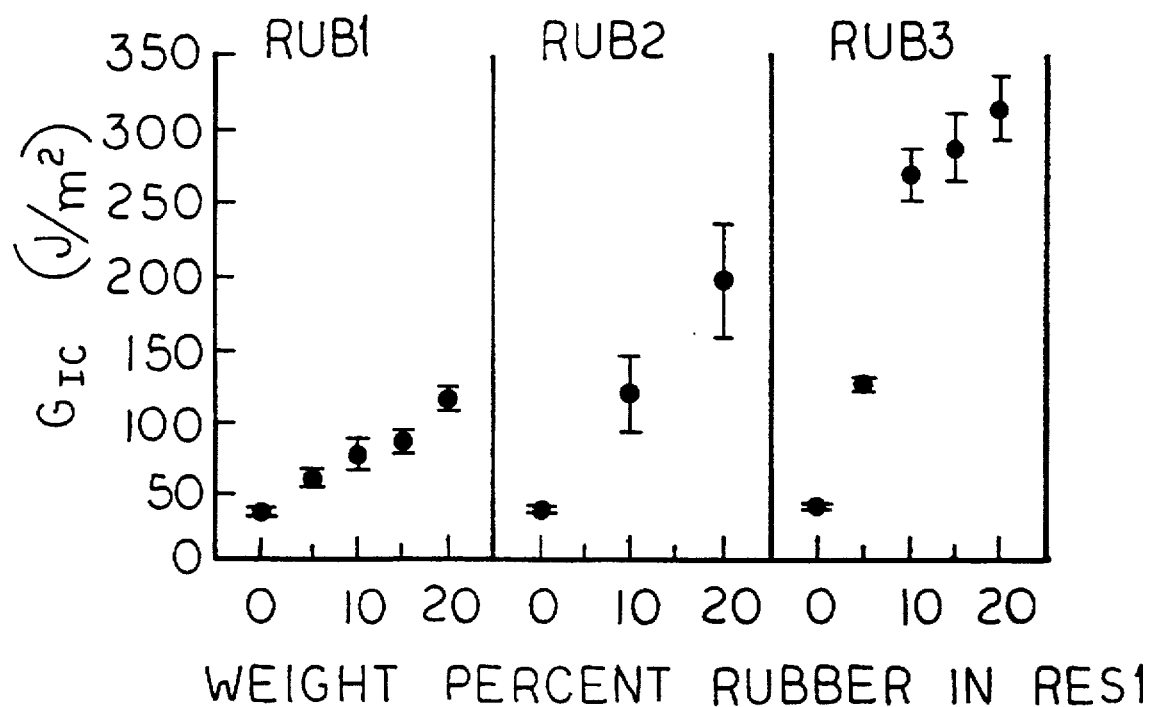
FIG. 6 is a graph of the critical strain energy release rate, $G_{Ic}$, of the silicone rubber-modified resins of FIG. 1, as determined in accordance with ASTM D 5045 and shown as a function of weight percent silicone rubber.

Referring Now to FIG. 6, it can be seen that regardless of the DP of the silicone rubber in the copolymer of the invention, the value of the critical strain energy release rate, $G_{Ic}$, of RES1 increased with increasing quantities of silicone rubber. Nonetheless, the rate of increase was highest when copolymerization was carried out with RUB3, which had the highest DP at 55.

It is important to note that the values of $K_{Ic}$ and $G_{Ic}$ of RES1 are substantially higher when the resin has been modified with silicone rubbers in accordance with the invention. FIG. 5 shows that the $K_{Ic}$ of unmodified RES1 is about 0.25 MPam$^{1/2}$. When RES1 is copolymerized with about 15 weight percent RUB3, the value of $K_{Ic}$ is about 0.47 MPa$^{1/2}$. This represents an increase in fracture toughness of over 80% compared to the unmodified condition. Likewise, $G_{Ic}$ increased from about 38 J/m$^2$ to about 260 J/m$^2$. This represents an increase in the critical strain energy release rate of over 585%.

An even more remarkable result of the present invention is that the increases in $K_{Ic}$ and $G_{Ic}$ were accompanied by increases of about 160% in the flexural strain at fracture, about 32% in the flexural stress at fracture and a 350% increase in integrated stress-strain toughness. These advantages were all obtained with only a minor reduction (about 21%) in Young's modulus. Accordingly, rigid silicone resins can be modified in accordance with the invention to display much more ductile behavior, without a substantial loss in rigidity.

As previously mentioned, RES1 was copolymerized with RUB4, in accordance with the invention. RUB4 was present in the copolymerized product at about two weight percent. When subjected to mechanical testing, it was found that the silicone rubber-modified resin had a flexural strain at fracture of 3.65 percent, flexural stress at fracture of 44.4 MPa, a Young's modulus of 1.79 GPa, toughness of 108.4 KJ/m$^3$, $K_{Ic}$ of 0.29 MPam$^{1/2}$ and $G_{Ic}$ of 62.5 J/m$^2$. Again, this represents an increase in fracture toughness of over 16% and an increase in the critical strain energy release rate of over 63% as compared to the unmodified RES1. Likewise, increases of about 48% in the flexural strain at fracture, about 16% in the flexural stress at fracture and 81% increase in integrated stress-strain toughness were observed. These benefits were obtained with only a minor reduction in the value of Young's modulus (i.e. less than 5%.)

Also as previously mentioned, RES1 was copolymerized with a combination of RUB3 and RUB4. Both RUB3 and RUB4 were used at a concentration of five weight percent each, the balance being RES1. When subjected to mechanical testing, it was found that the silicone rubber-modified resin had a flexural strain at fracture of 5.06%, flexural stress at fracture of 40.6 MPa, a Young's modulus of 1.34 GPa, integrated stress-strain toughness of 146.4 KJ/m$^3$, $K_{Ic}$ of 0.52 MPam$^{1/2}$ and $G_{Ic}$ of 282 J/m$^2$. Again, this represents an increase of about 100% in $K_{Ic}$ and an increase in the critical strain energy release rate $G_{Ic}$ of over 600% as compared to the unmodified RES1. Likewise, increases of about 106% in the flexural strain at fracture, about 6% in the flexural stress at fracture and 145% increase in integrated stress-strain toughness were observed. These benefits were obtained with only a minor reduction in the value of Young's modulus (i.e. less than 29%.)

Addition Cure System

Figure 7:
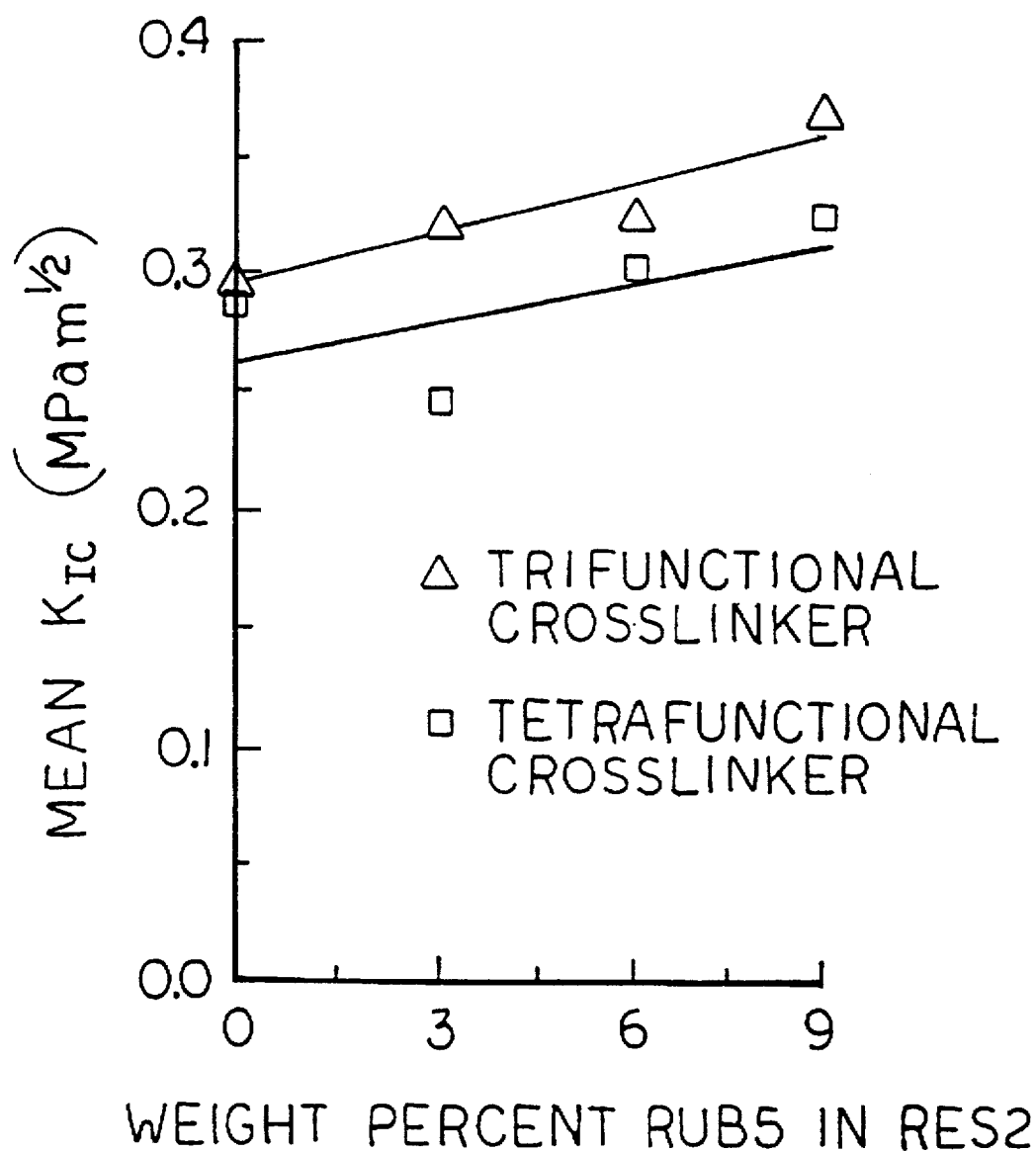
FIG. 7 is a graph of the fracture toughness, $K_{Ic}$ as determined in accordance with ASTM D 5045 of RES2, of a vinyl-functional silsesquioxane resin, modified with RUB5, a dimethylvinylsiloxy-terminated polydimethylsiloxane, which modification was carried out using a crosslinker and addition curing, and shown as a function of weight percent silicone rubber.

Referring now to FIGS. 7 and 8, it can be seen that the modification of RES2 with silicone rubber RUB5 also resulted in generally increasing values of $K_{Ic}$ and $G_{Ic}$ with increasing quantities of rubber. The benefits derived therefrom were not, however, as remarkable as those obtained in the condensation-cure systems. Nonetheless, increases of about 18% in the value of $K_{Ic}$ and over 100% in $G_{Ic}$ were observed.

It should be noted, however, that RES2 and RUB5 were combined utilizing two different crosslinkers, which differed in their hydrogen functionality. In each instance, a stoichiometric excess of the crosslinker was employed. In accordance with the graphic data of FIGS. 7 and 8, it appears that the trifunctional crosslinker had a greater effect on the values of $K_{Ic}$ and $G_{Ic}$ at a given content of RUB5. Accordingly, the effect of silicone rubber modification of resins may be influenced by crosslink density.

The interpretation of the above data with respect to crosslink density must be somewhat tempered. In the systems employed, both the resin, RES2, and the silicone rubber, RUB5, were vinyl functional and the crosslinkers were hydrogen functional. Thus, in the presence of the catalyst, the crosslinker was free to form bonds between: two or more RUB5 molecules with no RES2 molecules therebetween; two or more RES2 molecules, with no RUB5 molecules therebetween; and RES2 molecules with RUB5 molecules therebetween. The beneficial effects of the silicone rubber addition may be somewhat masked by the fact that the resin-to-resin bonds made by the crosslinker could have had the same effect as a shortening average DP of the silicone rubber.

EXAMPLES

GLASS FABRIC COMPOSITE MATERIALS UTILIZING THE RUBBER-MODIFIED RIGID SILICONE RESINS OF THE INVENTION AS A CONTINUOUS PHASE

Composite materials are generally defined as including at least two phases: 1) a continuous matrix phase; and 2) a reinforcing phase. Reinforcing phases may include monofilaments, chopped fibers and woven cloths. As set forth below, the advantages of using the novel rubber-modified rigid silicone resins of the invention as the continuous phase in such a composite material were explored.

Two, 12-ply laminate composite structures were prepared from unfinished, (heat cleaned) woven E-glass fabric (Type 7781) and unmodified RES1 and RES1 modified with 10 weight percent RUB3, respectively referred COMP1 and COMP2. The glass content of COMP1 was about 63% by weight, and that of COMP2 was about 59%, by weight. The cured slabs had thicknesses ranging from about 3.39 to 3.56 mm.

Once again, mechanical testing was carried out as previously described on specimens cut from the cured composite slabs. The results are set forth in Table I, below.

TABLE I

| | Flexural* Strain (%) | Flexural* Stress (MPa) | Young's Modulus (GPa) | Toughness** (KJ/m³) |
|---|---|---|---|---|
| RES1 (unmodified) | 2.17 | 169.52 | 10.53 | 246.55 |
| RES1 and 10% RUB3 | 2.80 | 250.32 | 11.95 | 437.02 |

*at fracture
**integrated stress-strain

The results set forth in Table I illustrate that the beneficial effects of the rubber-modified rigid silicone resins of the invention are still realized when the composition is utilized in the fabrication of a composite material.

Although the preceding invention has been described and illustrated by way of example to point out certain features and advantages thereof, the scope of the present invention should be interpreted only in accordance with the following claims and equivalents thereof.

What is claimed is:

1. A rubber-modified rigid silicone resin comprising a copolymerized reaction product of:
   (A) an organosilicon composition selected from the group consisting of:
      (I) an organosilicone resin of the empirical formula $$R^1_a R^2_b R^3_c SiO_{(4-a-b-c)/2}$$

wherein: a is a positive numerical value, b and c are zero or positive numerical values with the proviso that $0.8 < (a+b+c) <= 1.6$. $R^1$, $R^2$ and $R^3$ are monovalent radicals independently selected from the group consisting of hydrogen, hydroxyl, alkyl, alkenyl, alkoxy, oximo, alkyloximo, aryloximo, aryl, alkylepoxide, arylepoxide, alkylcarboxyl, arylcarboxyl, alkylether, arylether, alkylamide, arylamide, alkyl amino and arylamino radicals; and (II) hydrolyzable precursors of (I); and
      (III) hydrolyzate formed from (II); and
   (B) a silicone rubber of the empirical formula:

$$(R^4_{(3-p)}R^5_p SiO_{1/2})(R^4_2 SiO_{2/2})_x \text{-} \{(R^4_{(q-2)}R^5_q SiO_{2/2}) (R^4_2 SiO_{2/2})_x\}_y (R^4_{(3-p)}R^5_p SiO_{1/2})$$

wherein each $R^4$ is a monovalent radical independently selected from the group consisting of alkyl and aryl radicals, each $R^5$ is a monovalent radical independently selected from the group consisting of hydrogen, hydroxyl, alkenyl, alkoxy, oximo, alkyloximo, aryloximo, alkylepoxide, arylepoxide, alkylcarboxyl, arylcarboxyl, alkylamide, arylamide, alkyl amino and arylamino radicals, p is 1, 2 or 3, q is 1 or 2, x is greater than or equal to 6, and y ranges from zero to 10; and said organosilicon composition (A) and said silicone rubber (B) being present in relative quantities such that said rubber-modified silicone resin has a Young's modulus of at least $6.9 \times 10^8$ Pa.

2. A rubber-modified silicone resin in accordance with claim 1 wherein said copolymerized reaction product is obtained by a condensation reaction.

3. A rubber-modified silicone resin in accordance with claim 2 wherein said condensation reaction is carried out in the presence of a condensation catalyst.

4. A composition in accordance with claim 3 wherein said condensation catalyst is selected from the group consisting of choline octoate and metal esters and alkoxides of tin, titanium and zinc.

5. A rubber-modified silicone resin in accordance with claim 1 wherein said copolymerized reaction product is obtained by an addition reaction.

6. A rubber-modified silicone resin in accordance with claim 4 wherein said addition reaction is carried out in the presence of (D) an addition catalyst.

7. A rubber modified silicone resin in accordance with claim 6 wherein said addition catalyst is selected from the group consisting of platinum compounds and platinum complexes.

8. A rubber-modified silicone resin in accordance with claim 1 wherein said copolymerization reaction product further comprises a silicon-based crosslinker.

9. A rubber-modified silicone resin in accordance with claim 1 wherein said copolymerized reaction product is obtained by free-radical polymerization.

10. A rubber-modified silicone resin in accordance with claim 1 wherein the value of x in the empirical formula of said silicone rubber (B) ranges from 6 to 1,000.

11. A rubber-modified silicone resin in accordance with claim 1 wherein said organosilicon composition (A) and said silicone rubber (B) are present in relative quantities such that said rubber-modified silicone resin has a fracture toughness, as measured by $K_{Ic}$, that is at least 25% greater than the fracture toughness of the organosilicon composition (A) in its fully cured and unfilled state.

12. A rubber-modified silicone resin in accordance with claim 1 wherein said organosilicon composition (A) and said silicone rubber (B) are present in relative quantities such that said rubber-modified silicone resin has a fracture toughness, as measured by $K_{Ic}$, that is at least 50% greater than the fracture toughness of the organosilicon composition (A) in its fully cured and unfilled state.

13. A rubber-modified silicone resin in accordance with claim 1 wherein said organosilicon composition (A) and said silicone rubber (B) are present in relative quantities such that said rubber-modified silicone resin has a fracture toughness, as measured by $K_{Ic}$, that is at least 80% greater than the fracture toughness of the organosilicon composition (A) in its fully cured and unfilled state.

14. A rubber-modified silicone resin in accordance with claim 1 wherein said organosilicon composition (A) and said silicone rubber (B) are present in relative quantities such that said rubber-modified silicone resin has a fracture toughness, as measured by $K_{Ic}$, that is at least 100% greater than the fracture toughness of the organosilicon composition (A) in its fully cured and unfilled state.

15. A rubber-modified silicone resin in accordance with claim 1 wherein said organosilicon composition (A) and said silicone rubber (B) are present in relative quantities such that said rubber-modified silicone resin has a critical strain energy release rate, as measured by $G_{Ic}$, that is at least 25% greater than the critical strain energy release rate of the organosilicon composition (A) in its fully cured and unfilled state.

16. A rubber-modified silicone resin in accordance with claim 1 wherein said organosilicon composition (A) and said silicone rubber (B) are present in relative quantities such that said rubber-modified silicone resin has a critical strain energy release rate, as measured by $G_{Ic}$, that is at least 50% greater than the critical strain energy release rate of the organosilicon composition (A) in its fully cured and unfilled state.

17. A rubber-modified silicone resin in accordance with claim 1 wherein said organosilicon composition (A) and said silicone rubber (B) are present in relative quantities such that said rubber-modified silicone resin has a critical strain energy release rate, as measured by $G_{Ic}$, that is at least 100% greater than the critical strain energy release rate of the organosilicon composition (A) in its fully cured and unfilled state.

18. A rubber-modified silicone resin in accordance with claim 1 wherein said organosilicon composition (A) and said silicone rubber (B) are present in relative quantities such that said rubber-modified silicone resin has a critical strain energy release rate, as measured by $G_{Ic}$, that is at least 200% greater than the critical strain energy release rate of the organosilicon composition (A) in its fully cured and unfilled state.

19. A rubber-modified silicone resin in accordance with claim 1 wherein said component (B) is present in an amount from about 2 weight percent to about 30 weight percent of the combined weights of components (A) and (B).

20. In an article of manufacture comprising a composite, said composite including a continuous phase and reinforcing phase, the improvement comprising said continuous phase being the rubber-modified rigid silicone resin of claim 1.

* * * * *

UNITED STATES PATENT AND TRADEMARK OFFICE
CERTIFICATE OF CORRECTION

PATENT NO. : 5,747,608
DATED : May 5, 1998
INVENTOR(S) : Katsoulis et al.

It is certified that error appears in the above-indentified patent and that said Letters Patent is hereby corrected as shown below:

$$(R^4{}_{(3-p)}R^5{}_p SiO_{1/2})(R^4{}_2 SiO_{2/2})_x((R^4{}_{(2-q)}R^5{}_q SiO_{2/2})(R^4{}_2 SiO_{2/2})_x)_y(R^4{}_{(3-p)}R^5{}_p SiO_{1/2})$$

The above formula is to be inserted at the following places in the patent:

Column 2, Lines 32-33
Column 3, Lines 16-17
Column 5, Lines 16-17
Column 14, Lines 25-26

Signed and Sealed this

Twenty-third Day of November, 1999

*Attest:*

Q. TODD DICKINSON

*Attesting Officer*  *Acting Commissioner of Patents and Trademarks*